US010667076B2

(12) United States Patent
Nehmad

(10) Patent No.: US 10,667,076 B2
(45) Date of Patent: May 26, 2020

(54) SYSTEM FOR PROVIDING INFORMATION IN A MOBILITY AS A SERVICE VEHICLE REGARDING A SERVICE REQUESTOR MOBILE DEVICE AND METHOD THEREOF

(71) Applicant: Honda Motor Co., Ltd., Minato-ku, Tokyo (JP)

(72) Inventor: Michael S Nehmad, San Francisco, CA (US)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 15/960,773

(22) Filed: Apr. 24, 2018

(65) Prior Publication Data

US 2019/0327576 A1    Oct. 24, 2019

(51) Int. Cl.
| | |
|---|---|
| *H04W 4/02* | (2018.01) |
| *H04W 8/02* | (2009.01) |
| *H04W 76/10* | (2018.01) |
| *G01S 19/51* | (2010.01) |
| *H04W 4/40* | (2018.01) |
| *H04W 84/12* | (2009.01) |
| *H04W 88/16* | (2009.01) |

(52) U.S. Cl.
CPC ............. *H04W 4/02* (2013.01); *G01S 19/51* (2013.01); *H04W 4/40* (2018.02); *H04W 8/02* (2013.01); *H04W 76/10* (2018.02); *H04W 84/12* (2013.01); *H04W 88/16* (2013.01)

(58) Field of Classification Search
CPC ....... H04W 76/10; H04W 8/02; H04W 84/12; H04W 88/16; H04W 4/02; H04W 4/40; G01S 19/51; H04L 9/321; H04L 9/083; G07C 9/00714

USPC ........... 455/456.1; 701/36, 45, 49, 53, 29.3; 340/426.28, 425.5, 545
See application file for complete search history.

(56) References Cited

U.S. PATENT DOCUMENTS

| | | | |
|---|---|---|---|
| 6,738,712 B1 * | 5/2004 | Hildebrant ............ | G01C 21/26 701/431 |
| 2010/0171642 A1 * | 7/2010 | Hassan .................. | G01C 17/38 340/992 |
| 2011/0099040 A1 * | 4/2011 | Felt ..................... | G06Q 10/0631 705/7.12 |
| 2014/0143328 A1 * | 5/2014 | Miller .................... | H04W 4/08 709/204 |
| 2015/0012310 A1 * | 1/2015 | Shen ...................... | G06Q 10/02 705/5 |

(Continued)

FOREIGN PATENT DOCUMENTS

| | | |
|---|---|---|
| WO | 9306501 A1 | 4/1993 |
| WO | 2013036199 | 3/2013 |

*Primary Examiner* — Rafael Pérez-Gutiérrez
*Assistant Examiner* — Farid Seyedvosoghi
(74) *Attorney, Agent, or Firm* — Rankin, Hill & Clark LLP

(57) ABSTRACT

In a perspective of a service provider within a MaaS vehicle, a service provider mobile device may determine a distance and approaching direction of the service requestor mobile device. The service provider mobile device may determine the distance and the approaching direction through GPS coordinates using a unified gateway or through a more direct communication. The MaaS vehicle via the service provider mobile device may provide information regarding the distance and the approaching direction of the service requestor mobile device. This information may be in the form of audio and/or visual cues.

19 Claims, 16 Drawing Sheets

(56) References Cited

U.S. PATENT DOCUMENTS

| | | |
|---|---|---|
| 2017/0153714 A1 | 6/2017 | Gao et al. |
| 2017/0190318 A1* | 7/2017 | Imamura ................. G01S 19/14 |
| 2017/0236193 A1* | 8/2017 | Zundel ............... G06Q 10/0833 |
| | | 705/16 |
| 2017/0354196 A1 | 12/2017 | Tammam et al. |
| 2018/0262336 A1* | 9/2018 | Fujiwara ............... H04L 9/0894 |

\* cited by examiner

SYSTEM FOR PROVIDING INFORMATION IN A MOBILITY AS A SERVICE VEHICLE REGARDING A SERVICE REQUESTOR MOBILE DEVICE AND METHOD THEREOF

BACKGROUND

Mobility as a Service (MaaS) may allow personally owned, or rented, vehicles to be used as ride hailing services. A unified gateway may create and manage trips for both a service provider and service requestor of the MaaS, typically through mobile devices. They may receive and provide payment through the unified gateway. Upfront pricing may be quoted as an estimated fare based on a pick up location and destination. Alternatively, pricing may be based similarly to a taximeter where the service requestor is charged depending on a time and distance of the trip.

In an illustrative example of how MaaS works, the service requestor may pull up their mobile application. They may enter their destination and select a vehicle type with a number of people using the service. Pricing may be provided to the service requestor. The pricing may include current traffic and surges. The service requestor may then request a ride and confirm their pickup location. This location may automatically be set based on their device's position or the service requestor may select the location where they wish to be picked up. The service requestor may wait at the pickup location and a vehicle that the service requestor selected would pick them up. Fare payments may be handled automatically through the application.

In dense urban areas and where a high concentration of pedestrians may exist, the current MaaS has a number of drawbacks. For example, when the MaaS vehicle arrives at the pickup location, the service provider may not be aware of which person to pick up. This may result in a pickup of a mistaken party who did not order the service. On the other side, the service requestor, who ordered the service, may not get picked up by their vehicle. This may result in confusion. The present disclosure provides systems and methods thereof that address these concerns. Other benefits and advantages will become clear from the disclosure provided herein and those advantages provided are for illustration.

BRIEF DESCRIPTION

This summary is provided to introduce a selection of concepts in a simplified form that are further described below in the DESCRIPTION OF THE DISCLOSURE. This summary is not intended to identify key features of the claimed subject matter, nor is it intended to be used as an aid in determining the scope of the claimed subject matter.

In accordance with one aspect of the present disclosure, a method for providing information within a Mobility as a Service (Maas) vehicle operating through a unified gateway regarding a service requestor mobile device is provided. The method may include determining a distance between the service requestor mobile device and the vehicle. In addition, the method may include identifying an approaching direction of the service requestor mobile device to the vehicle. The method may also include providing information within the vehicle indicating the distance and the approaching direction of the service requestor mobile device.

In accordance with another aspect of the present disclosure, a vehicle within a MaaS network operated through a unified gateway is provided. The vehicle may include a receiver communicating with the unified gateway and at least one indicator and a control system. The control system may include receiving a location of a service requestor mobile device through the receiver communicating with the unified gateway. The control system may determine an approaching direction of the service requestor mobile device and provide information about the approaching direction through the at least one indicator.

In accordance with yet another aspect of the present disclosure, a vehicle computing system within a MaaS vehicle in communication with a unified gateway is provided. The vehicle may include at least one processor and a memory operatively coupled to the processor, the memory storing program instructions that when executed by the processor, causes the processor to perform processes. These processes may include receiving a distance and approaching direction of the service requestor mobile device and providing an audio or visual indicator within the vehicle based on the distance and approaching direction of the service requestor mobile device.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DESCRIPTION OF THE DISCLOSURE

The description set forth below in connection with the appended drawings is intended as a description of exemplary embodiments of the disclosure and is not intended to represent the only forms in which the present disclosure may be constructed and/or utilized. The description sets forth the functions and the sequence of blocks for constructing and operating the disclosure in connection with the illustrated embodiments. It is to be understood, however, that the same or equivalent functions and sequences may be accomplished by different embodiments that are also intended to be encompassed within the spirit and scope of this disclosure.

The present disclosure relates to Mobility as a Service (MaaS) operating on a unified gateway. More particularly, this disclosure describes a system for identifying a service requestor mobile device that ordered a ride in a dense urban area where a high concentration of pedestrians may be present. In one illustrative embodiment, and from a perspective of a service provider within a MaaS vehicle, a service provider mobile device may determine a distance and approaching direction of the service requestor mobile device. The service provider mobile device may determine the distance and the approaching direction through GPS coordinates using a unified gateway or through a more direct communication. The MaaS vehicle via the service provider mobile device may provide information regarding the distance and the approaching direction of the service requestor mobile device. This information may be in the form of audio and/or visual cues.

Numerous other modifications or configurations to the MaaS will become apparent from the description provided below. Advantageously, the driver of the MaaS vehicle may be able to pick up a correct passenger by providing the cues regarding the distance and approaching direction of the service requestor mobile device. Furthermore, the service requestor mobile device may get into the right vehicle that they ordered for the ride. Other advantages will become apparent from the description provided below.

Figure 1:
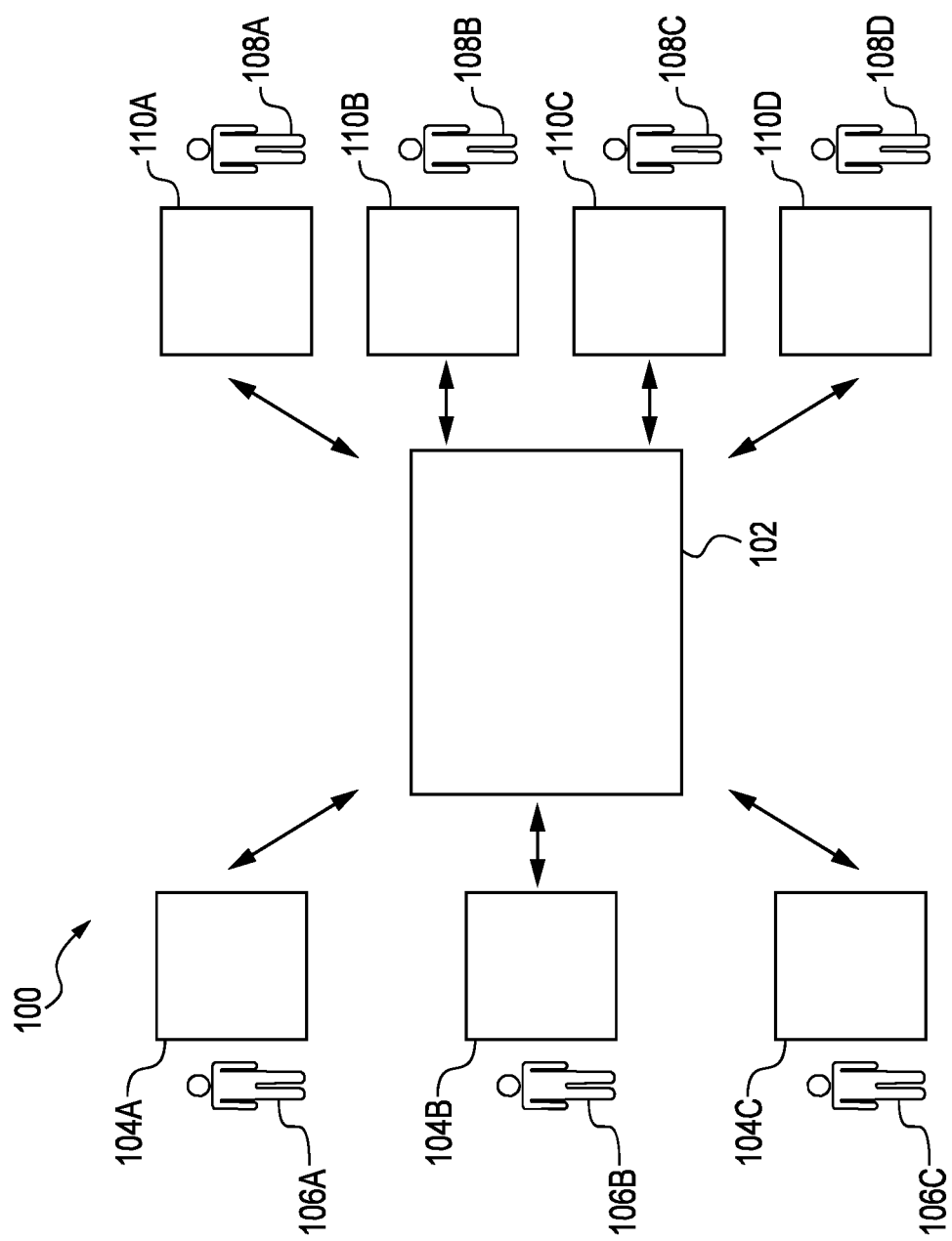
FIG. 1 is a schematic diagram of illustrative systems communicating with an exemplary unified gateway for providing Mobility as a Service (Maas) in accordance with one aspect of the present disclosure.
Figure 2:
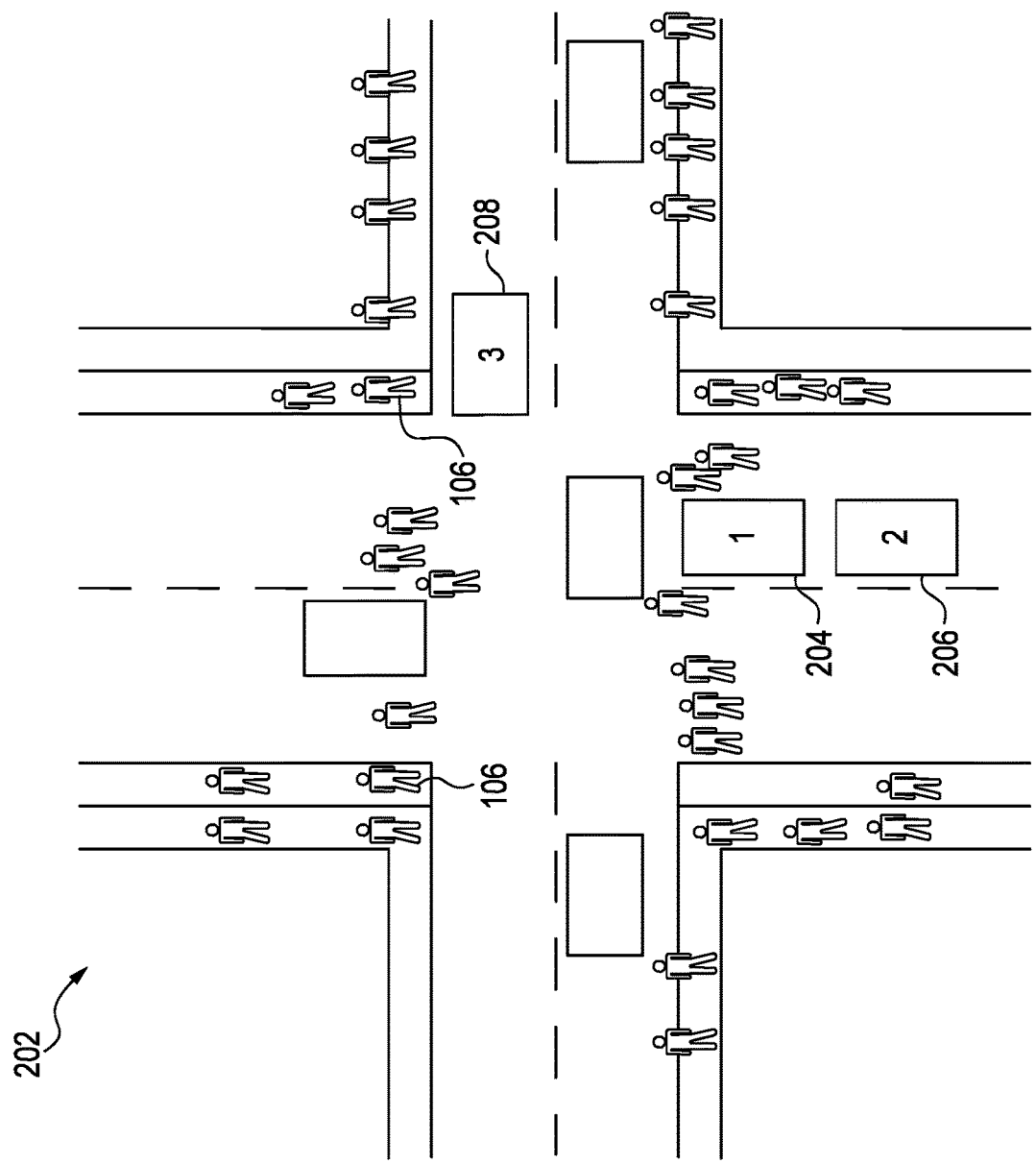
FIG. 2 is a schematic diagram of exemplary vehicles within the MaaS environment as part of a dense urban area surrounded by high concentrations of pedestrians in accordance with one aspect of the present disclosure.
Figure 3:
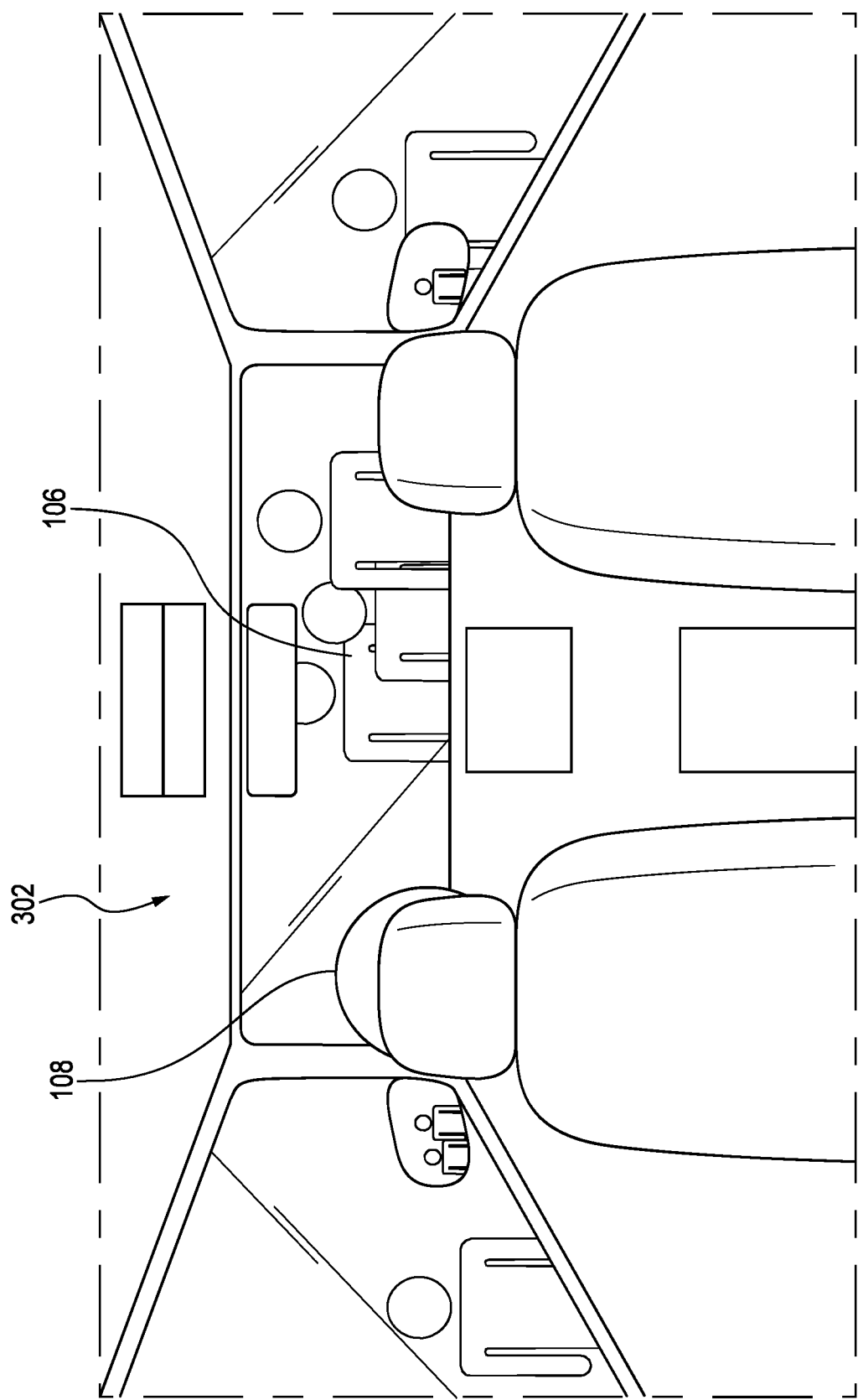
FIG. 3 is a schematic diagram of an exemplary view from a perspective of a service provider of a vehicle providing the MaaS surrounded by the high concentrations of pedestrians in accordance with one aspect of the present disclosure.
Figure 4:
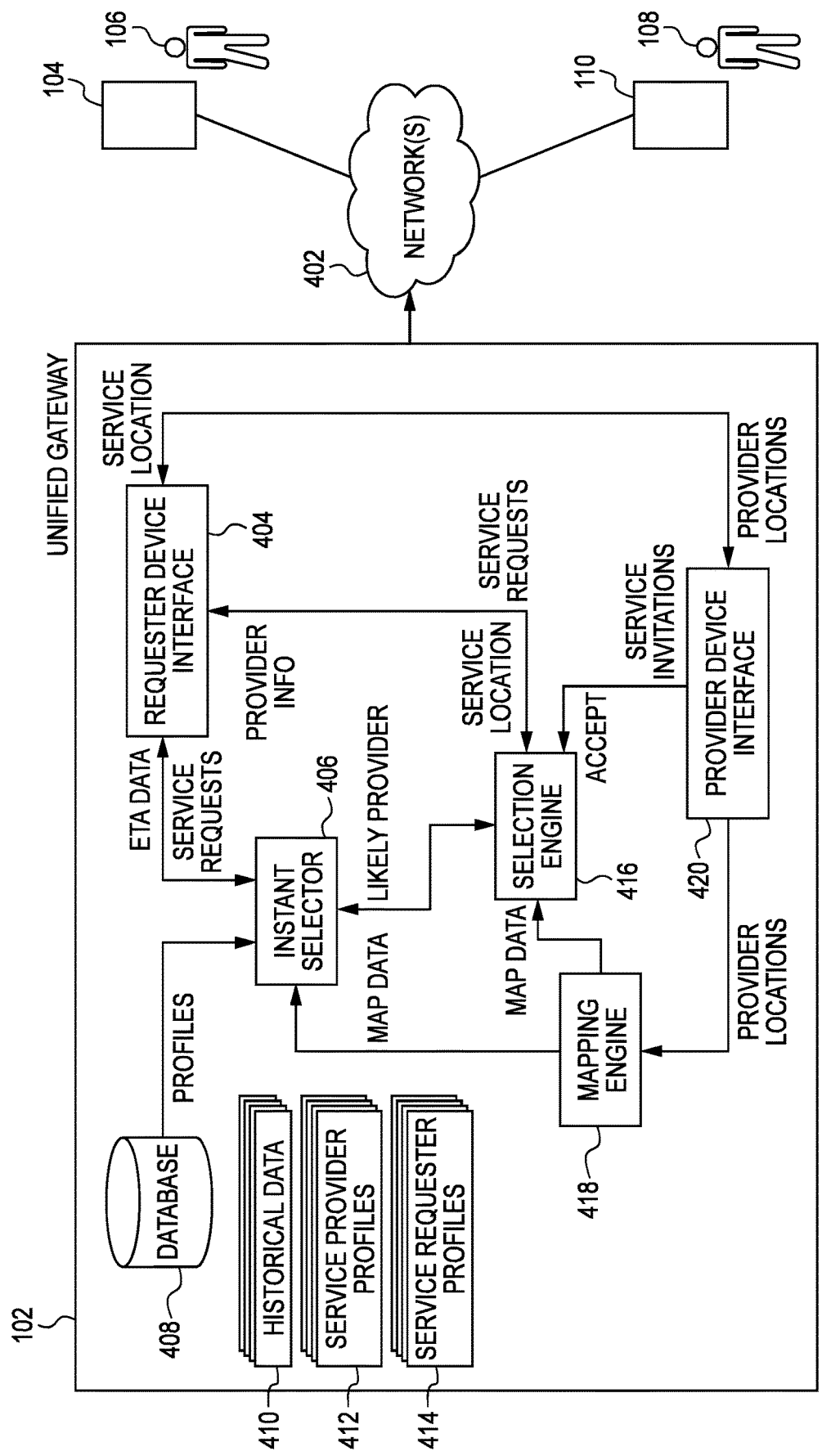
FIG. 4 is a schematic diagram of the exemplary unified gateway showing components for establishing the MaaS with the service requestor and service provider in accordance with one aspect of the present disclosure.
Figure 5:
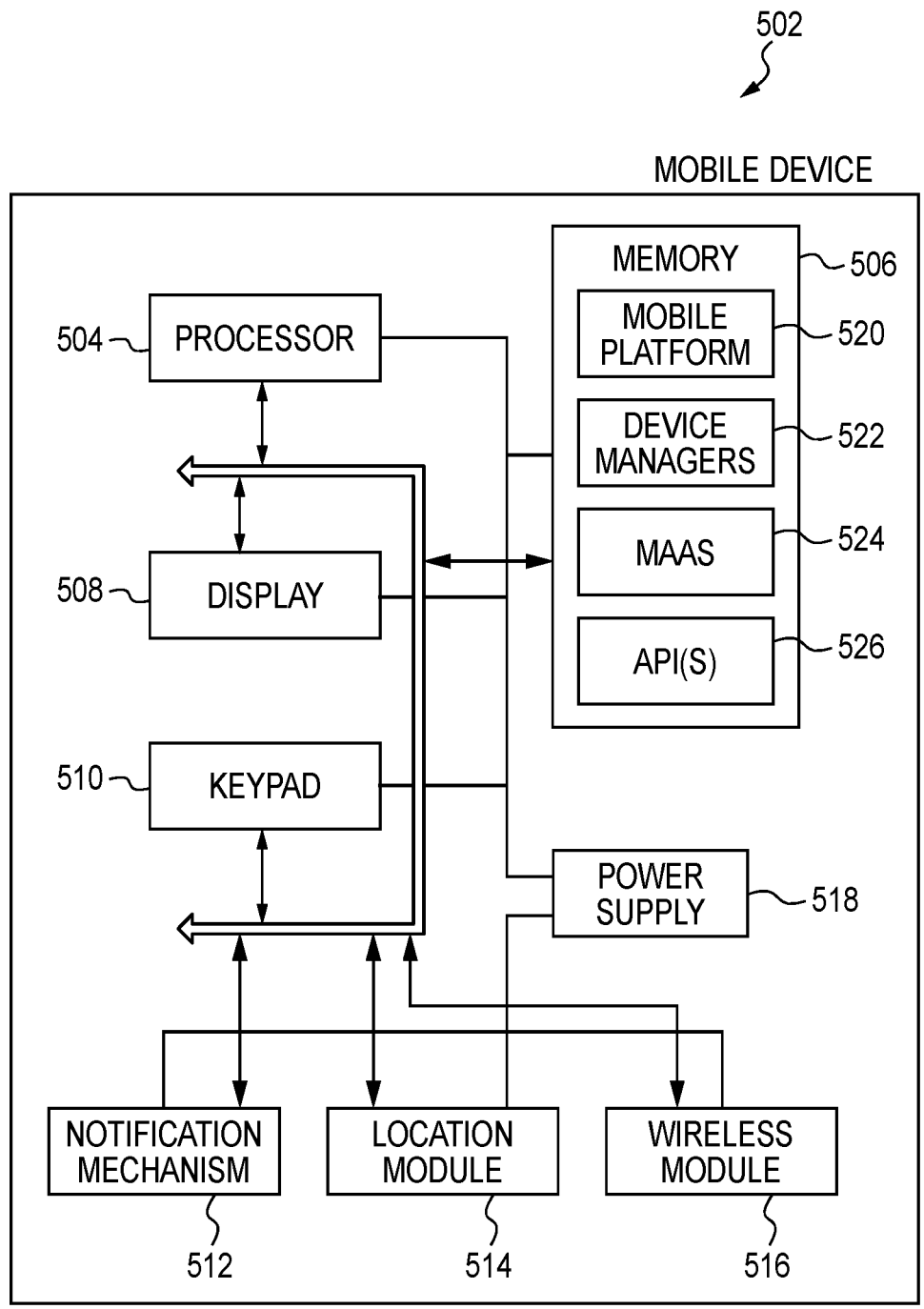
FIG. 5 is a schematic diagram showing illustrative hardware and software components of a typical mobile device for the service requestor or service provider in accordance with one aspect of the present disclosure.
Figure 6:
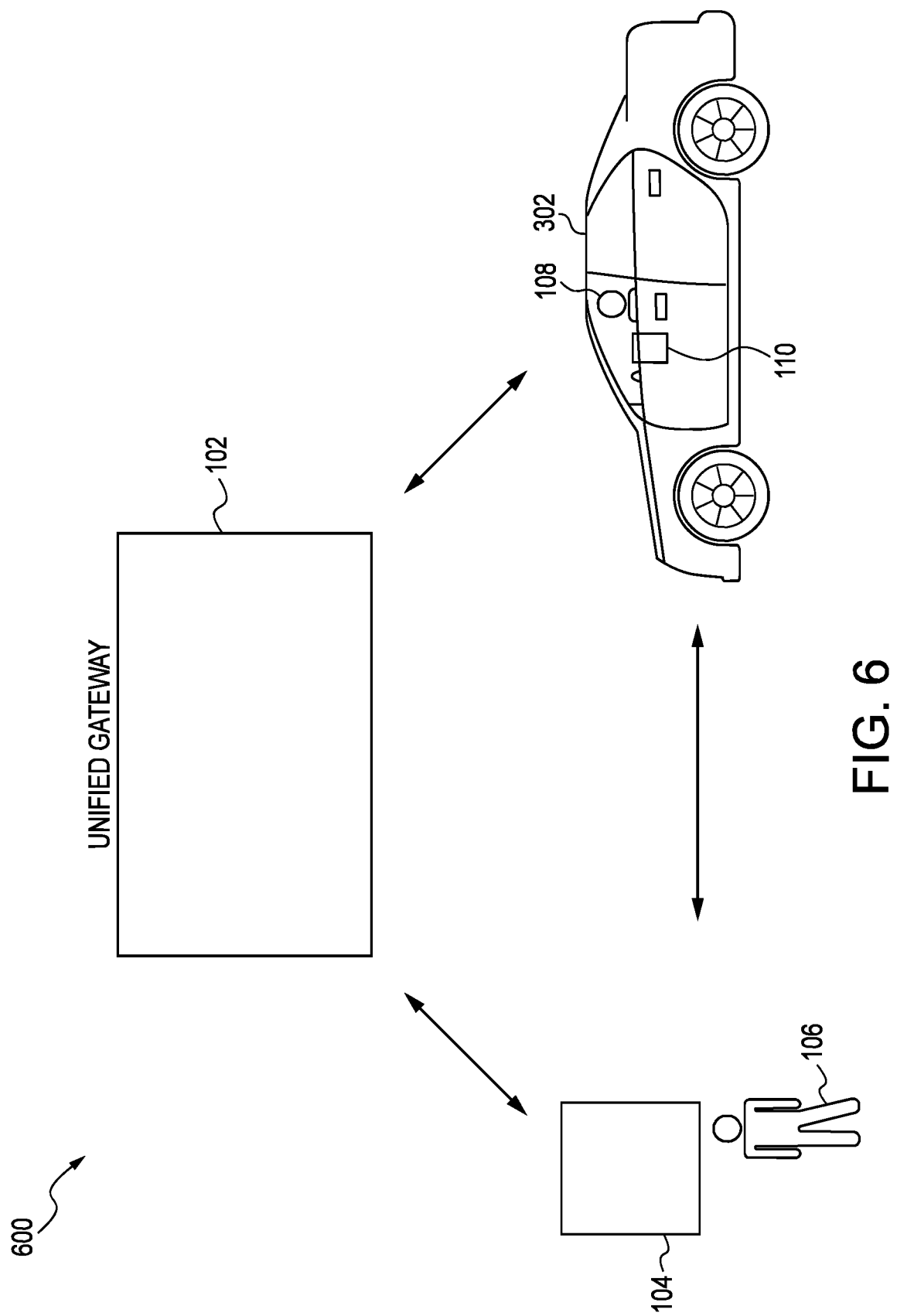
FIG. 6 is a schematic diagram showing illustrative communication techniques for transferring information between the mobile devices of the service requestor and service provider in accordance with one aspect of the present disclosure.
Figure 7:
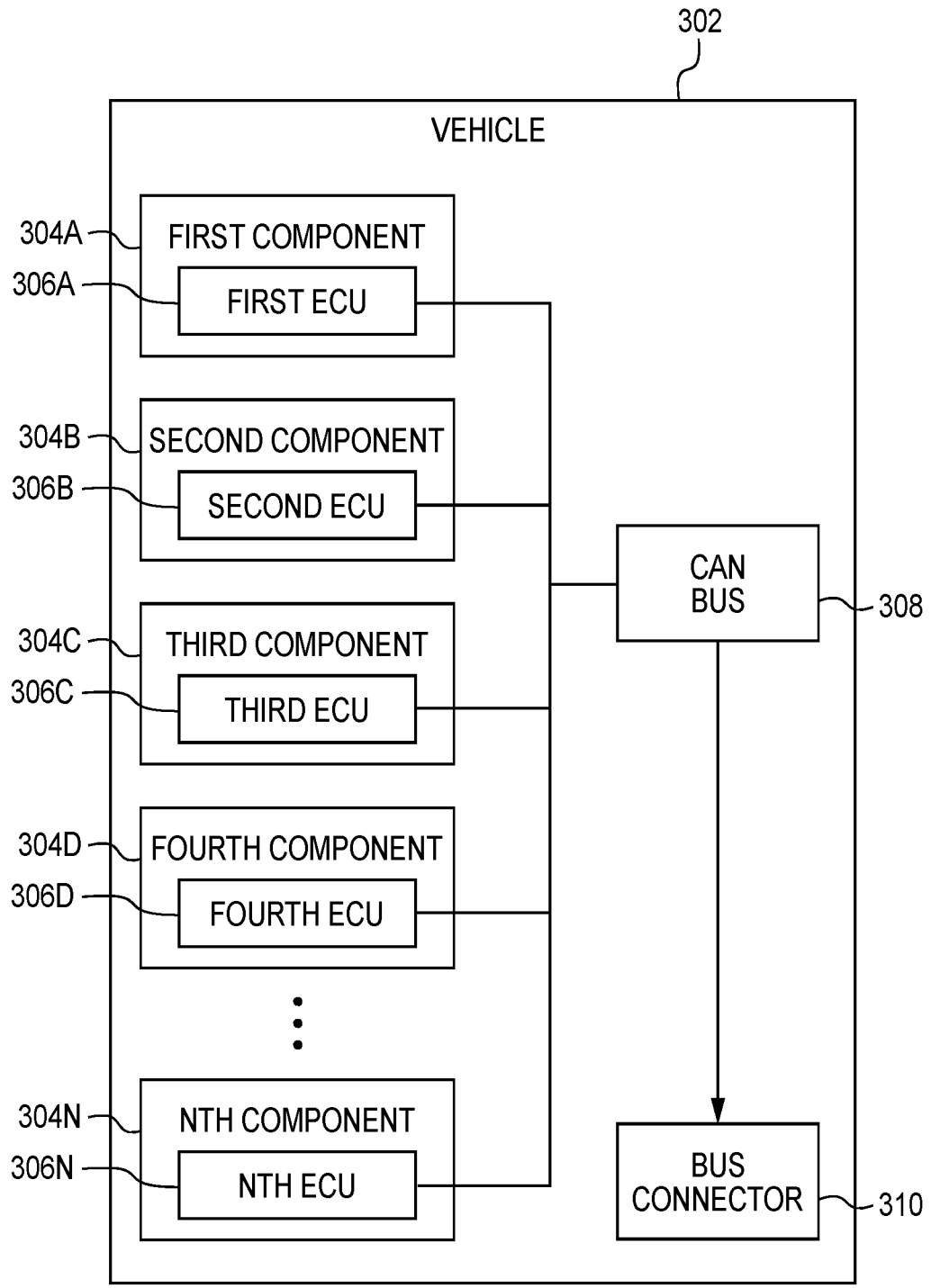
FIG. 7 is a schematic diagram that provides illustrative components within the vehicle for modifying vehicle functions or features in accordance with one aspect of the present disclosure.
Figure 14:
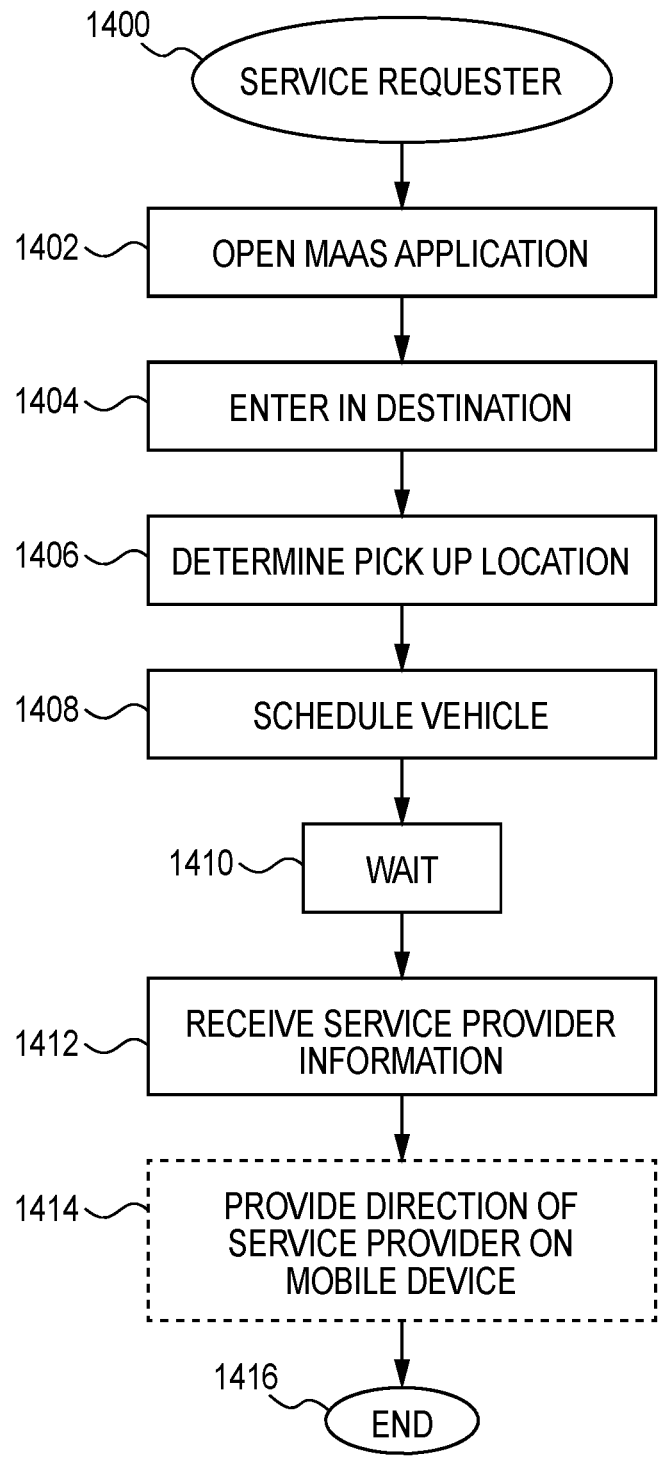
FIG. 14 is a block diagram that provides illustrative processes from the perspective of the service requestor in accordance with one aspect of the present disclosure.
Figure 15:
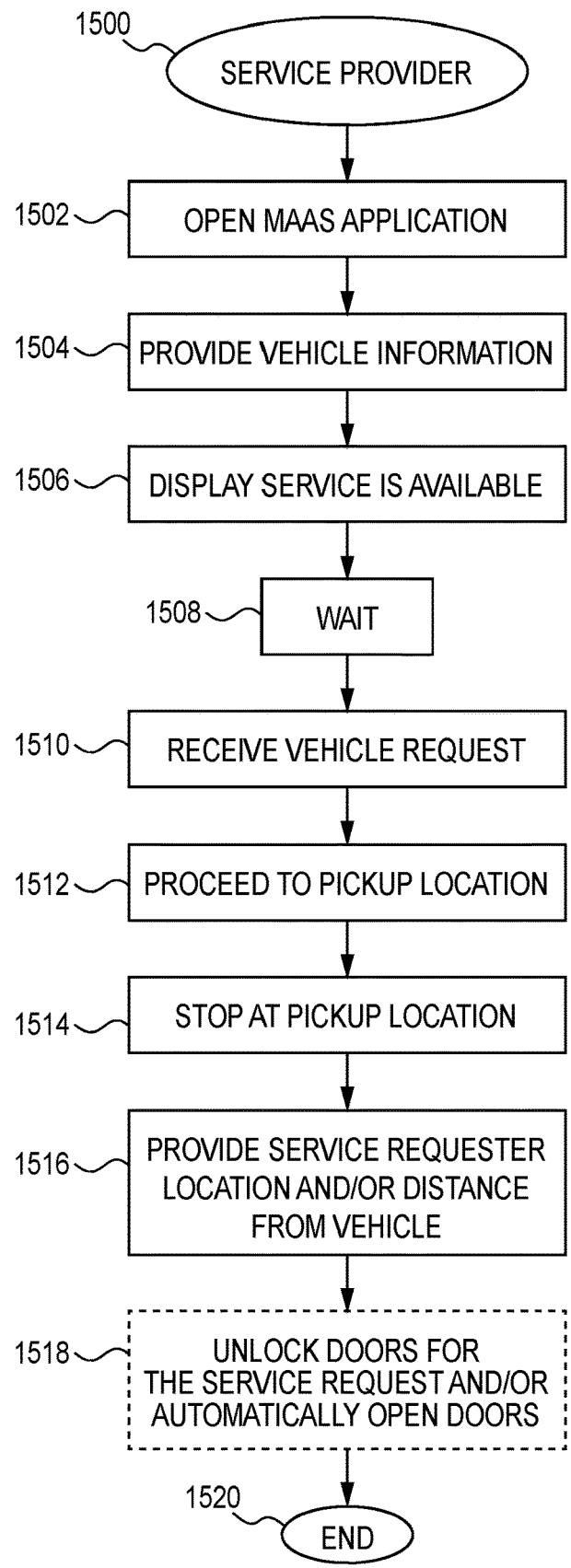
FIG. 15 is a block diagram that provides illustrative processes from the perspective of the service provider in accordance with one aspect of the present disclosure.
Figure 16:
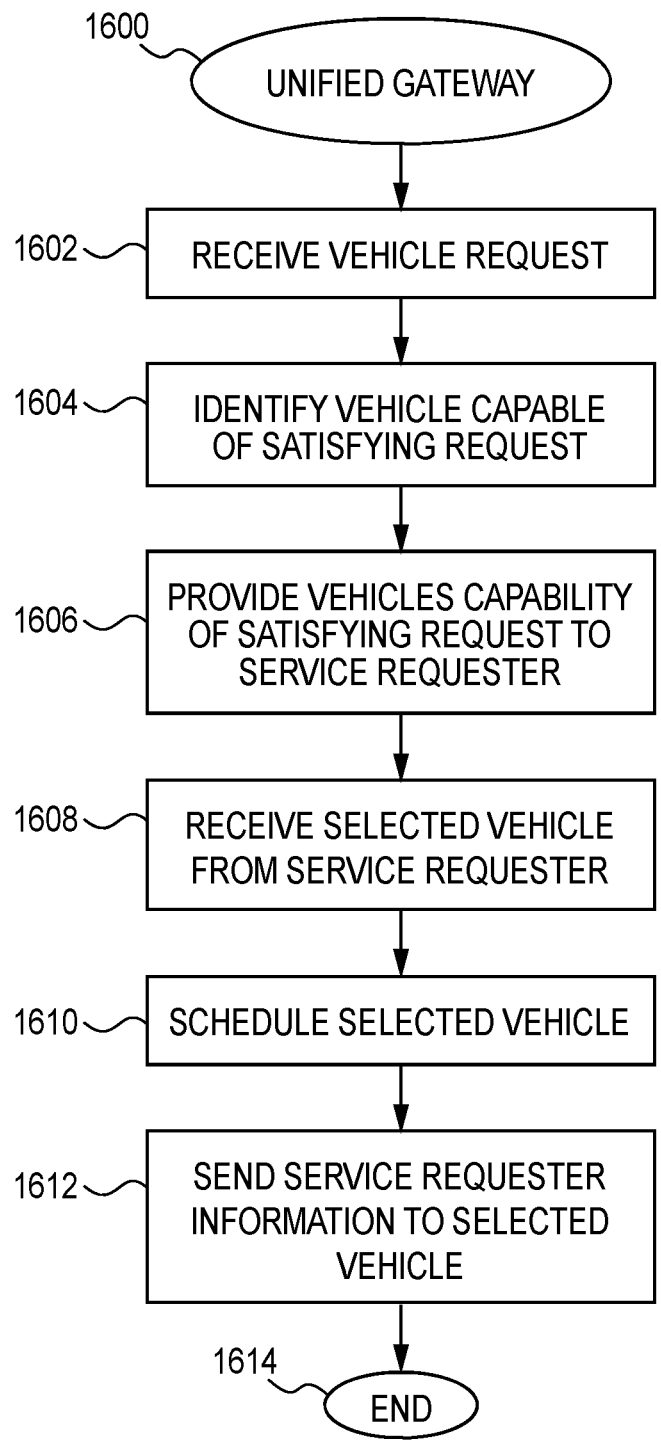
FIG. 16 is a block diagram that provides illustrative processes from the perspective of the unified gateway in accordance with one aspect of the present disclosure.

The present disclosure will disclose multiple environments for the system in FIGS. 1 through 3, followed by a description of hardware for the unified gateway and mobile devices for both the service requestor and service provider in FIGS. 4 and 5. FIGS. 6 and 7 will describe indirect and direct communications between the mobile devices. FIGS. 8 through 13 will show a MaaS situation with solutions contemplated within the present disclosure. FIGS. 14 through 16 will provide flow charts describing processes from the perspective of a service requestor, service provider and the unified gateway.

Turning now to FIG. 1, a schematic diagram of illustrative systems communicating with an exemplary unified gateway 102 for providing MaaS in accordance with one aspect of the present disclosure is provided. Different configurations may exist and the environment 100 shown is not intended to be limiting to MaaS. Rather, the MaaS environment 100 is intended to be simplistic and show basic components. Other components may be added or removed from the environment 100.

The unified gateway 102 within the environment 100 may combine services from public and private service providers 108A, 108B, 108C and 108D (Collectively "service providers 108" and individually "service provider 108"). The gateway 102 may be used to create and manage a ride. The gateway 102 may allow service requestors 106A, 106B and 106C (Collectively "service requestors 106" and individually "service requestor 106") to pay as well as distribute payment to those service providers 108. The gateway 102 may implement or manage an on-demand ride service that connects service requestors 106 with service providers 108 that are available to fulfill ride requests.

The on-demand ride service of the unified gateway 102 may provide a platform that enables sharing services between service requestors 106 and available service providers 108 by way of a service requestor application that may be executed on a service requestor mobile device 104A, 104B and 104C (Collectively "service requestor mobile devices 104" and individually "service requestor mobile device 104"), and a service provider application executing on the service provider mobile devices 110A, 110B, 110C and 110D (Collectively "service provider mobile devices 110" and individually "service provider mobile device 110"). As used within the present disclosure, the service requestor mobile device 104 and the service provider mobile device 110 may include a computing device with functionality to execute a designated application corresponding to the on-demand ride service managed by the unified gateway 102. In many examples, the service requestor mobile device 104 and the service provider mobile device 110 may include computing devices, such as smartphones, tablet computers, virtual reality (VR) or augmented reality (AR) headsets, on-board computing systems of vehicles, and the like.

FIG. 2 is a schematic diagram of exemplary vehicles within the MaaS environment 100 as part of a dense urban area 202 surrounded by high concentrations of pedestrians in accordance with one aspect of the present disclosure. This is an illustrative scenario and should not be construed as limiting. The urban area 202 shown includes a number of pedestrians who have surrounded the service provider 108 that has answered a ride service request. A number of other MaaS vehicles 204, 206 and 208 may be within the urban area 202.

With current ride hailing services, any pedestrian may easily jump into one of the MaaS vehicles 204, 206 or 208.

The pedestrian may have not ordered the ride and the service provider 108 may service their request as the service provider 108 may wish to pick up a passenger quicker. Thus, through providing cues, a correct service requestor 106 may be properly connected with a right service provider 108 in a correct MaaS vehicles 204, 206 or 208

FIG. 3 is a schematic diagram of an exemplary view from a perspective of the service provider 108 of a vehicle 302 providing the MaaS surrounded by the high concentrations of pedestrians in accordance with one aspect of the present disclosure. As shown, the service provider 108, who is typically a driver, may not understand where the service requestor 106 is and potentially, a pedestrian who has not ordered the service may get into the vehicle 302. The service requestor 106 may be hidden among a number of pedestrians and hard to identify from the perspective of the service requestor 106 since oftentimes they have not met one another. In some instances, and because of this confusion, the service provider 108 may pick up the wrong passenger.

With reference to FIG. 4, a schematic diagram of the exemplary unified gateway 102 showing components for establishing the MaaS with the service requestor 106 and service provider 108 in accordance with one aspect of the present disclosure is provided. The unified gateway 102 may communicate with a network 402 to provide services to the service requestor 106 and their mobile device 104 and the service provider 108 and their mobile device 110.

The unified gateway 102 may include a requestor device interface 404. The interface 404 may communicate with the service requester mobile devices 104 over one or more networks 402 via a service requestor application. An instant selector 406 of the unified gateway 102 may be used to streamline the selection process of connecting a service requestor 106 to one of the service providers 108. When a service requestor 106 submits a service request through the service requester application, the instant selector 406 may transmit service provider information for one of the service providers 108 back to the service requestor mobile device 110 prior to the selection engine 416 receiving an acceptance or sending a service invite to the service providers 108.

In various implementations, the unified gateway 102 may include a database 408 storing service requestor profiles 414 specific to the individual users of the on-demand service. Such information may include user preferences of service types, routine routes, service locations, and destinations, work addresses, home addresses, addresses of frequently visited locations (e.g., a gym, grocery store, mall, local airport, sports arena or stadium, concert venue, local parks, and the like). In addition, the database 408 may store service provider profiles 412 indicating information specific to individual service providers 108, such as vehicle type, service qualifications, earnings data, and service provider experience. The database 408 may also store historical data 410 regarding service requestor and service provider liquidity for a given area, that is, how often a new service provider 108 is expected to make themselves available for on-demand services in the area. The gateway 102 may include a database 408 storing service requester profiles 414 specific to the individual users of the on-demand service.

The unified gateway 102 may include the selection engine 416 to process the service requests in order to ultimately select service providers 108 to fulfill the service requests. The gateway 102 may include a service provider device interface 420 to communicate with the service provider devices 108 via the service provider application. In accordance with various examples, the service provider mobile devices 110 may transmit their current locations using location-based resources of the service provider mobile devices 110, for example, global positioning system (GPS). These service provider locations may be utilized by the selection engine 416 to identify a set of candidate service providers 108, in relation to the service location, that may service the service request.

A mapping engine 418, as part of the unified gateway 102, may utilize a third-party mapping service to generate map data and or traffic data in the environment surrounding the service location. The mapping engine 418 may receive the service provider locations and input them onto the map data.

FIG. 5 is a schematic diagram showing illustrative hardware and software components of a typical mobile device 502 for the service requestor 106 or service provider 108 in accordance with one aspect of the present disclosure. While represented as working with only mobile devices 502, those skilled in the relevant art will appreciate that other types of devices may be used. For example, sharing data may be used by non-mobile systems having limited resources. Personal computers may be used or in-vehicle units may provide similar functions and features described below.

The mobile device 502 may have a processor 504 for implementing logic, a memory 506, a display 508 and a keypad 510. The display 508 of the mobile device 502 may be a liquid crystal display (LCD), or any other type of display commonly used in mobile devices 502. The display 508 may be touch-sensitive, and may act as an input device. The keypad 510 may be a push button numeric dialing pad such as on a typical telephone, a multi-key keyboard such as a conventional keyboard, or any other device for inputting textual data.

The memory 506 generally includes both volatile memory such as RAM and non-volatile memory such as ROM, flash memory or the like. The non-volatile portion of the memory 506 may be used to store persistent information which should not be lost when the mobile device 502 is powered down. The mobile device 502 may include a mobile platform 520. The mobile platform 520 may reside in the memory 506 and be executed on the processor 504.

The memory 506 may also include one or more device managers 522 for interacting with one or more input/output (I/O) devices. The device managers 522 may be software installed on the mobile device 502. A device manager 522 may correspond to each I/O device. In addition to the device manager 522, one or more application programs may be loaded into memory 506 and run on or in association with the mobile platform 520. These applications may use and store information in the memory 506, such as e-mail or other messages used by an e-mail application, contact information, appointment information used by a scheduling program, documents used by a word processing program, instant messaging information used by an instant messaging program and the like.

Also within the memory 506, a MaaS application 524 may run on the mobile device 502. The application 524 may be used by the service requestor 106 and/or service provider 108. The application 524 may be specific to the service requestor 106 and/or specific to the service provider 108. The application 524 for the service requestor 106 may be utilized for on-demand arraignment of ride services. This application 524 may transmit a service request to the network 402 and then to the unified gateway 102. Location information about the service requestor 106 may be provided, that is, a location of the service requestor 106 or a pickup location.

On the other side, the application 524 for the service provider 108 may be used to receive requests from the service requestors 106. An accept button or deny button may be used by the service provider 108 to accept the ride request. The application 524 on the service provider 108 side may be used to provide location information.

A collection of one or more APIs 526 may be provided for facilitating wireless communications between the mobile device 502 and one or more remote I/O devices. The APIs 526 may be invoked by the applications to recognize and control the one or more remote I/O devices. In this manner, the mobile device 502 may be able to take advantage of services or functionalities of the one or more remote I/O devices.

The mobile device 502 may also include a power supply 518, which may be implemented as one or more batteries, solar cells, or other sources of electrical power. The power supply 518 might further include an external power source, such as an AC adapter or a powered docking cradle that supplements or recharges the batteries.

The mobile device 502 may also include one or more audio, visual, and/or vibratory notification mechanisms 512. These notification mechanisms 512 may be directly coupled to the power supply 518 so that when activated, they remain on for a duration dictated by the notification mechanism 512 even though the processor 504 and other components might shut down to conserve energy. Examples of notification mechanisms 512 may include one or more LEDs, an audio interface, and a vibration generator.

In one embodiment, and in particular with the service provider 108, the notification mechanism 512 may be tied to the vehicle through a wireline or wireless connection with the vehicle. On the service provider application 524, the notification mechanism 512 may be associated with the vehicle and command cues within the vehicle, which will be provided in more details below.

The mobile device 502 may also include a location module 514. Both the location information from the service requestor 106 and the service provider 108 may be used. This information may be used to determine the distance and approaching distance between the two. A GPS navigation device, GPS receiver, or simply GPS is a device that may be capable of receiving information from GPS satellites and then calculate the device's geographical position. Using suitable software, the mobile device 502 may display the position on a map, and it may offer directions.

The mobile device 502 may also include a wireless module 516 that facilitates wireless connectivity between the mobile device 502 and the outside world via the communications network. This connection may be with the unified gateway 102. The module 516 may also include a wireless communication for nearby devices such as near field communications (NFC), Bluetooth® or the like. This communication may be direct versus indirect via the unified gateway 102.

FIG. 6 is a schematic diagram showing illustrative communication techniques for transferring information between the mobile devices 104 and 110 of the service requestor 104 and service provider 108 in accordance with one aspect of the present disclosure. Illustrative examples will be provided below on determining locations of each of the mobile devices 104 and 110. The communications may be direct or indirect. Further embodiments may be contemplated and are not limited to those shown below.

Through the unified gateway 102, indirect communications may take place between the mobile devices 104 and 110 to determine each other's distance from one another and/or approaching direction. Location information, from the location module 514 on each of the devices 104 and 110 may be provided to the unified gateway 102. The information may be processed on the unified gateway 102 such that the direction and/or approaching direction with respect to one another may be sent to each of the devices 104 and 110.

Alternatively, the unified gateway 102 may act as an intermediary and forward the location information from one party to another. That is, the unified gateway 102 may forward the location from the service requestor mobile device 104 to the service provider mobile device 110 through the unified gateway 102. Location information from the service requestor mobile device 104 may be provided through constant updates to the service provider mobile device 110 from the unified gateway. The service provider mobile device 110 may then process this information to determine distance and/or approaching direction information. Similarly, the location information from the service provider mobile device 110 may be sent to the unified gateway and then forwarded to the service requestor mobile device 104 for processing.

In a more direct communication, the service requestor mobile device 104 and service provider mobile device 110 may use its wireless module 516 to communicate with one another. This may occur through NFC or Bluetooth®. A communication channel may be opened that is unique to the MaaS. The service provider vehicle 302 may open the channel or the service provider mobile device 110 may start the communication. Constant communications between the service requestor mobile device 104 and service provider mobile device 110 may be provided.

In one illustrative embodiment, the service provider mobile device 110 may search or scan for the service requestor mobile device 104 around the vehicle 302. This may reduce the amount of interactions with the unified gateway 102. A directional sensor may be used. In one embodiment, the information sent by the service requestor mobile device 104 or service provider mobile device 110 may not be unique. Rather the information would be generic such that the service requestor mobile device 104 and/or service provider mobile device 110 are looking for one another. Alternatively, a unique key may be shared between them that the unified gateway 102 provides. Through this key, the service requestor mobile device 104 and service provider mobile device 110 may communicate with one another confidentially. A variety of encryption techniques may be used such that communications may be kept private between the service requestor 104 and service provider 108.

FIG. 7 is a schematic diagram that provides illustrative components within the vehicle 302 for modifying vehicle functions or features in accordance with one aspect of the present disclosure. In some implementations, the MaaS application 524 on the service provider mobile device 110 may be used to manipulate vehicle functions on the vehicle 302. This may work with the service requestor mobile device 104.

The vehicle 302 may include multiple automotive components 304A through 304N (collectively "components 304" or individually "component 304") that may communicate via electronic control units 306A through 306N (collectively "ECUs 306" or individually "ECU 306"). The components 304 may include individual apparatuses, systems, subsystems, mechanisms and the like that may be included in the vehicle 302. The components 304 may include, but are not limited to, windows, door locks, ignition system, windshield wipers, brakes, engines, GPS and navigation systems, tachometer and the like.

In one particular embodiment, a first ECU 306A associated with the first component 304A may be provided. The first component 304A may be a door lock. The first component 304A may be associated with a number of door locks or a single lock on the vehicle 302. The first ECU 306A may communicate a state or a condition of the first component 304A as a data signal to the CAN bus 308. For example, with the first component 304A, that is the door lock, the first ECU 306A may communicate whether the door is locked or unlocked in real time to the CAN bus 308.

A signal may be provided to the first ECU 306A to open or close the door lock 304A. For purposes of illustration, and which will be described in more details below, a signal or communication may be sent from the first ECU 306A to the first component 304A. Different signals may be received and provided to the first ECU 306A to lock and/or unlock the doors. Multiple ECUs 306 may exist to control the separate doors.

Associated with the first component 304A, may be a second component 304B that may open and/or close the doors. Some vehicle models may use automated doors 304B. For example, side doors may automatically open and/or close on a minivan. Advantageously, this may remove the difficult task of opening and/or closing these doors. In other embodiments, a trunk or tailgate 304B may be opened or closed automatically. These may be opened as the service requestor 106 gets close to the vehicle 302. Instructions may be received from the unified gateway 102 by the service requestor mobile device 104 to open the vehicle 302.

A second ECU 306B may communicate information from the doors 304B. A state or a condition of the second component 304B may be provided as a data signal to the CAN bus 308. For example, with the second component 304B, that is the automated doors, the second ECU 306B may communicate whether the door is to be opened and/or closed in real time to the CAN bus 308.

A third component 304C may include a single or plurality of lights within the vehicle 302. The lights 304C may be controlled by a third ECU 306C. A state or a condition of the third component 304C may be provided as a data signal the CAN bus 308. When the service requestor 106 may be close to the vehicle 302, the lights 304C may be shown, flashed and the like. Inside and/or outside lights 304C may be controlled by the ECU 306C.

A fourth component 304D may include audio functions. For example, speakers within the vehicle 302 may be controlled within the fourth component 304D. The speakers 304D may be turned on and/or off within the vehicle 302. The speakers 304D may be adjusted to different parameters, for example, its treble and base. A fourth ECU 306D may control the fourth component 304D. A state or a condition of the fourth component 304D may be provided as a data signal to the CAN bus 308. Furthermore, communication signals may be sent from the fourth ECU 306D to the fourth component 304D to control the speakers.

The first ECUs 306A to the Nth ECU 306N may communicate the data signals to the CAN bus 308 regarding the state or the condition of the first component 304A and the Nth component 306N, respectively. Accordingly, the data signals may include, but are not limited to, positions of the windows, positions of the door locks, ignition timing, state of the windshield wipers, a position of the steering wheel, RPM of the engine, automated doors and the like.

In some embodiments, the CAN bus 308 may be coupled to a bus connector 310 that enables access to the CAN bus 308. For example, in this and other embodiments, the vehicle 302 may include an On Board Diagnostics (OBD) connector. The bus connector 310 may be configured according to an OBD 1 specification, for instance. In embodiments with multiple CAN buses 308, the vehicle 302 may include multiple bus connectors 310 and/or alternative bus connectors that enable access to one or more CAN buses 308. In most modern vehicles, the CAN bus 308 may include the bus connector 310 located under the hood or accessible through the removal of a panel in the cabin of the vehicle 302. However, embodiments described herein may be implemented by using a connector that connects with CAN bus 308 in any available way.

In one embodiment, the vehicle 302 may communicate with the unified gateway 102 directly. By doing this, the unified gateway 102 may communicate information about the service requestor mobile device 104 to the vehicle 302. This communication may occur through a transmission control unit (TCU) associated with the vehicle 302. Because the vehicle 302 knows its location, the distance and/or approaching direction may be determined through the TCU. The functions and features may be changed through the TCU connected to the bus connector 310. This may include unlocking and/or locking the first component 304A, opening and/or closing the automated door 304B, turning on or off the lighting 304C or other functions and features.

The bus connector 310 may be connected to the service provider mobile device 110 in one embodiment. This may use the wireless module 516 to speak with the unified gateway 102. Modifying the functions and features of the components 304 may occur through the service provider mobile device 110. In one embodiment, when the service requestor mobile device 104 is close to or within a predetermined threshold of the service provider mobile device 110, then a vehicle component 304 may be changed or manipulated. For example, the doors 304A may unlock when the service requestor mobile device 104 is within two (2) feet of the vehicle 302.

In operation, the service provider mobile device 110 may be able to determine the status of the component 304 through the ECUs 306. Using this status, the components 304 may be manipulated, that is, they may be changed to lock and/or unlock the door, automatically open and/or close the door and turn off or on the lights. The service provider mobile device 110 may communicate via the bus connector 310 these changes. The service provider mobile device 110 may communicate through a wireline connection or wirelessly to the bus connector 310.

Through this connection, the service provider mobile device 110 may communicate with the service requestor mobile device 104 either directly or indirectly. As described above, the service provider mobile device 110 may communicate with the service requestor mobile device 104 indirectly through the unified gateway 102. Alternatively, the service provider mobile device 110 may communicate with the service requestor mobile device 104 directly through wireless communications, which may include the use of NFC or Bluetooth®.

Figure 8:
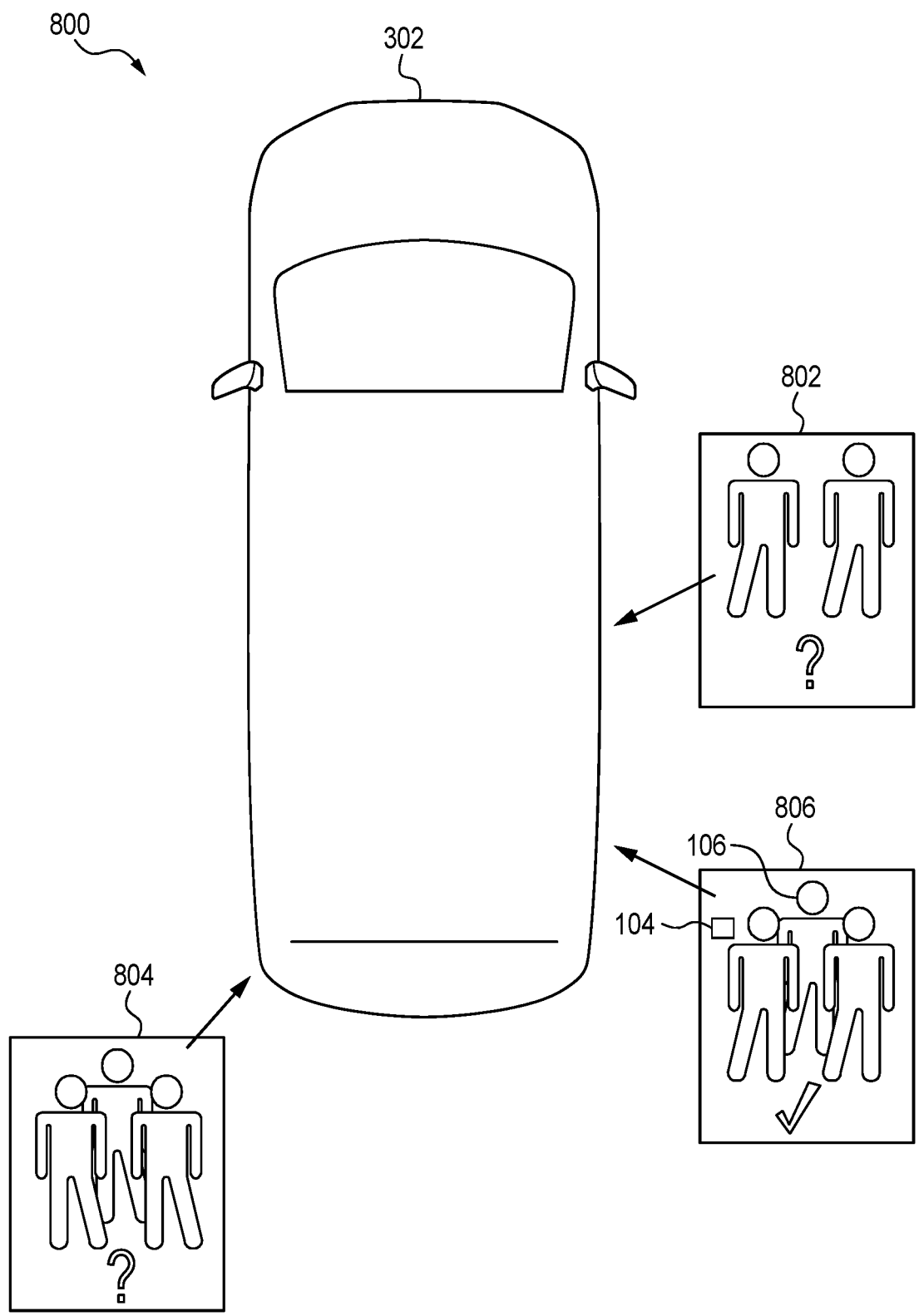
FIG. 8 is a schematic diagram that provides an exemplary environment showing difficulties in identifying a service requestor in accordance with one aspect of the present disclosure.

FIG. 8 is a schematic diagram that provides an exemplary environment 800 showing difficulties in identifying a service requestor 106 in accordance with one aspect of the present disclosure. As shown in the environment 800, the service provider vehicle 302 may be surrounded by a number of pedestrians 802, 804 and 806. The first set of pedestrians 802 may approach the vehicle 302 from a right side. This set of pedestrians 802 did not order the service. They may still approach the vehicle 302, however, as they may believe that the vehicle 302 is open for service.

A second set of pedestrians 804 may also approach the vehicle 302, this time from the back left portion of the vehicle 302. They too have not ordered the vehicle 302 for a pickup. The third set of pedestrians 806 may be the correct service requestor 106 through their mobile device 104. However, based on the numbers of pedestrians 802, 804 and 806, the service provider 108 within the vehicle 302 may have a hard time determining who the actual pedestrians would be for pick up.

Figure 9:
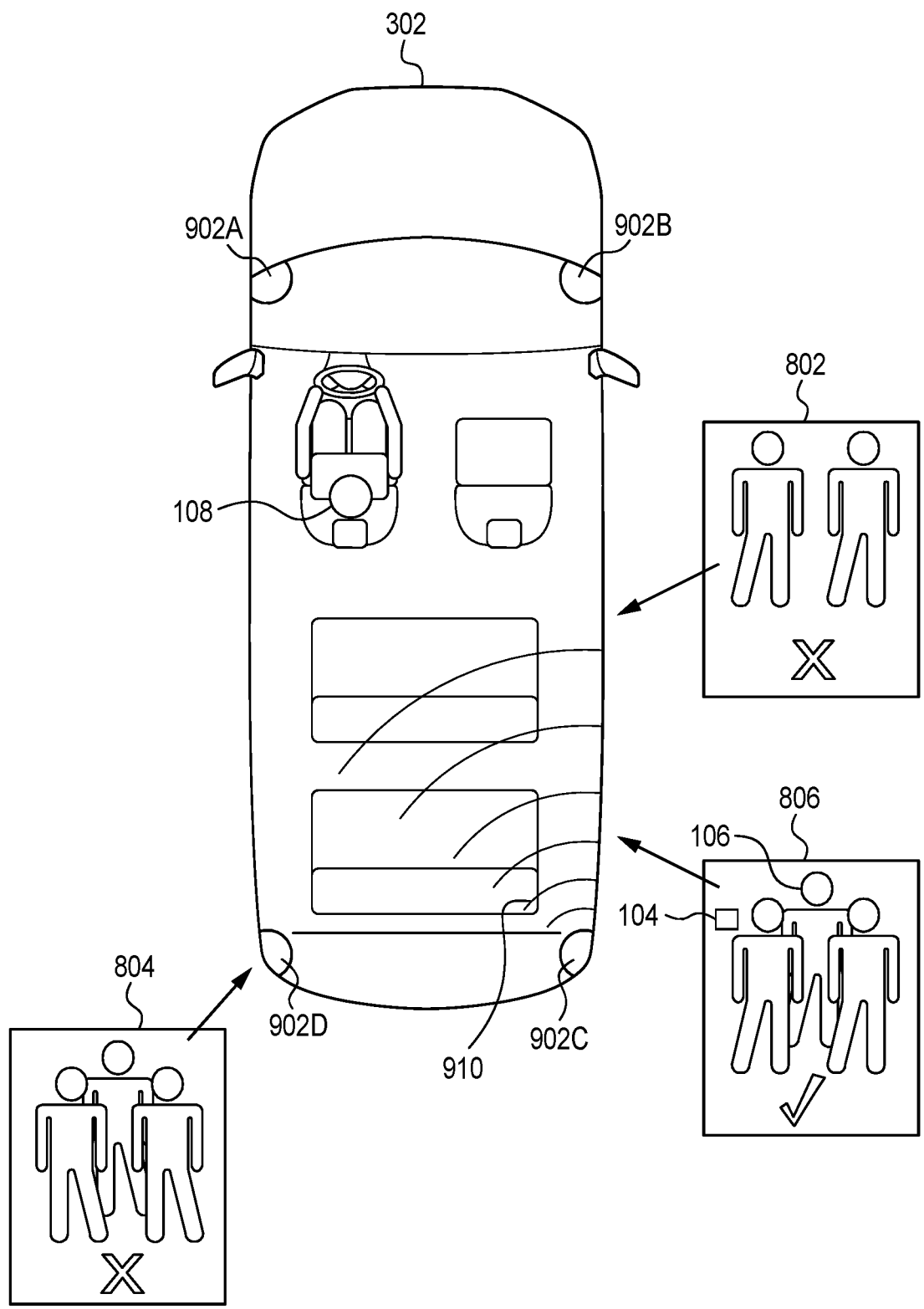
FIG. 9 is a schematic diagram that shows the exemplary vehicle providing audial information regarding the service requestor mobile device in accordance with one aspect of the present disclosure.

FIG. 9 is a schematic diagram that shows the exemplary vehicle 302 providing audial information regarding the service requestor mobile device 104 in accordance with one aspect of the present disclosure. For purposes of illustration, a set of speakers 902A, 902B, 902C and 902D (Collectively "speakers 902" and individually "speaker 902") may be placed around the vehicle 302. These speakers may include a front left speaker 902A, front right speaker 902B, back right speaker 902C and back left speaker 902D. Through the speakers 902, the correct pedestrians 806 to be picked up may be distinguished from the incorrect pedestrians 802 and 804.

Sound placement to indicate where the service requestor 106 may be coming from may be determined by the location information determined earlier. This information may be used to pinpoint a distance and/or direction of travel by the service requestor 106 through their service requestor mobile device 104. This information may be presented by the fourth component 304D and fourth ECU 306D, as described above. While shown as a single speaker 902C being used from the direction of the service requestor mobile device 104, other speakers 902A, 90B and 908D may be used. Noise cancellation may be implemented to highlight the effect from the speaker 902C.

As shown, the audio 910 may come from the back right speaker 902C to indicate the direction of which the service requestor 106 is approaching the vehicle 302. The audio 910 may be based on the direction and/or the distance between the service requestor mobile device 104 and the vehicle 302. In one embodiment, the audio 910 may indicate, with more beeps, if the service requestor mobile device 104 is close, while less beeps may indicate that the service requestor mobile device 104 is further away. This may indicate the distance and direction of the service requestor 106.

Figure 10:
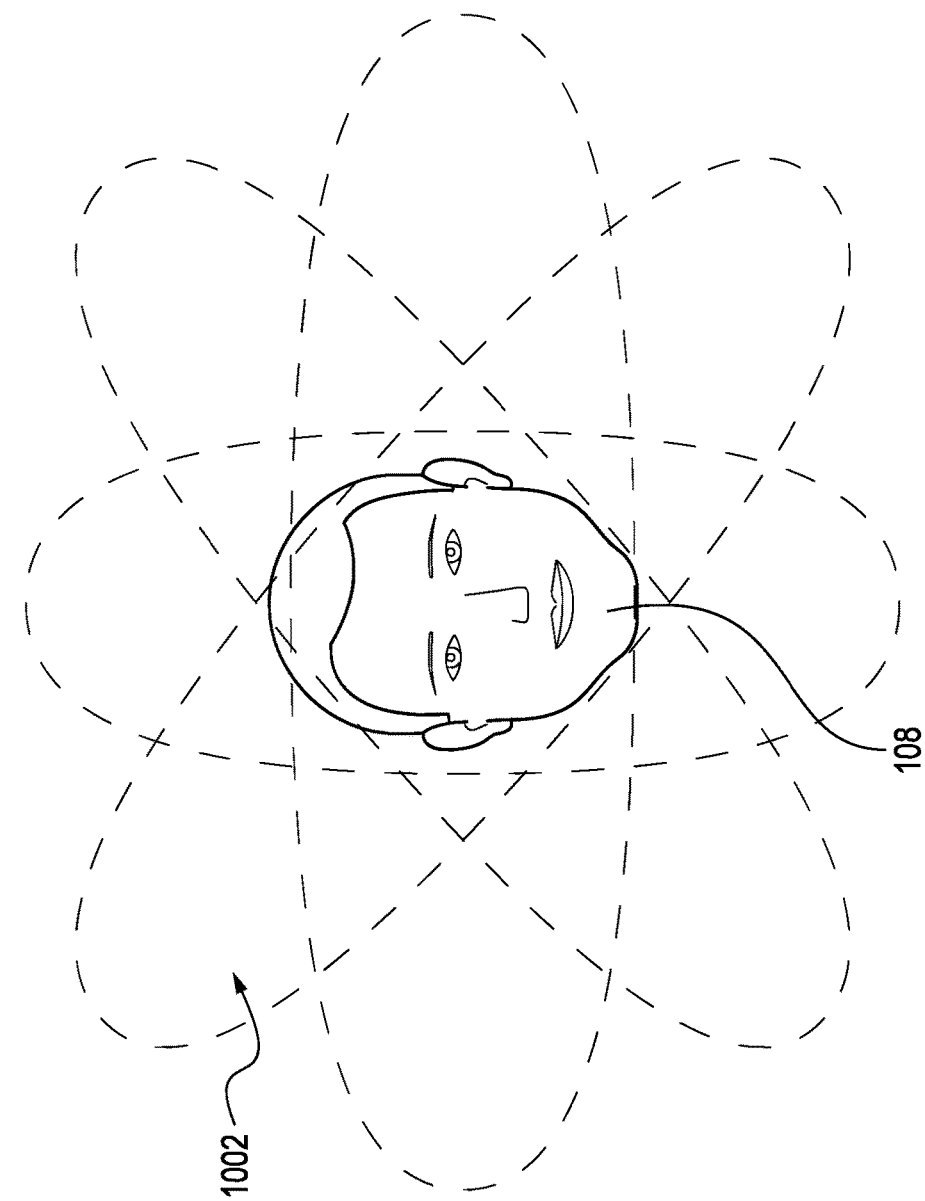
FIG. 10 is a schematic diagram of an illustrative sound configuration that provides audio information around the service provider in accordance with one aspect of the present disclosure.

FIG. 10 is a schematic diagram of an illustrative sound configuration that provides audio information around the service provider 108 in accordance with one aspect of the present disclosure. A sound void 1002 may be created around the service provider 108 through a number of speakers 1004A, 1004B, 1004C and 1004D (Collectively "speakers 1004" and individually "speaker 1004"). This may be directed around the driver who may be the service provider 108. The sound void 1002 may be created by determining a position of the service provider 108 and determining where their ears are in relation to other features on their face. Through this, the speakers 1004 may cancel sound out and provide appropriate directional and/or distance audio information to the service provider 108.

In one embodiment, the speakers 1004 may be placed around the face of the service provider 108. These may be provided in the walls of the vehicle 302. At least a portion of the speakers 1004 may be placed within the seats of the vehicle 302. Other areas for the speakers 1004 may include the dashboard, pillars, roof, doors and the like. The speakers 1004 may be directed in such a way to create the sound void 1002. The speakers 1004 may be on a horizontal plane, vertical plane or a combination of these.

The sound void 1002 may create an area where sound may be directed to ears of the service provider 108. The ears may be identified within the sound void 1002. Directional audio may provide information where the service requestor 106 may be approaching from and their distance to the vehicle 302. In one embodiment, extraneous sounds may be removed within the sound void 1002 such that the service provider 108 may listen to the service requestor 106. This may be performed by noise cancellation techniques. For example, and not limited to, a waveform that is an exact negative of ambient sounds may be mixed with audio that the service provider 108 listens to.

Figure 11:
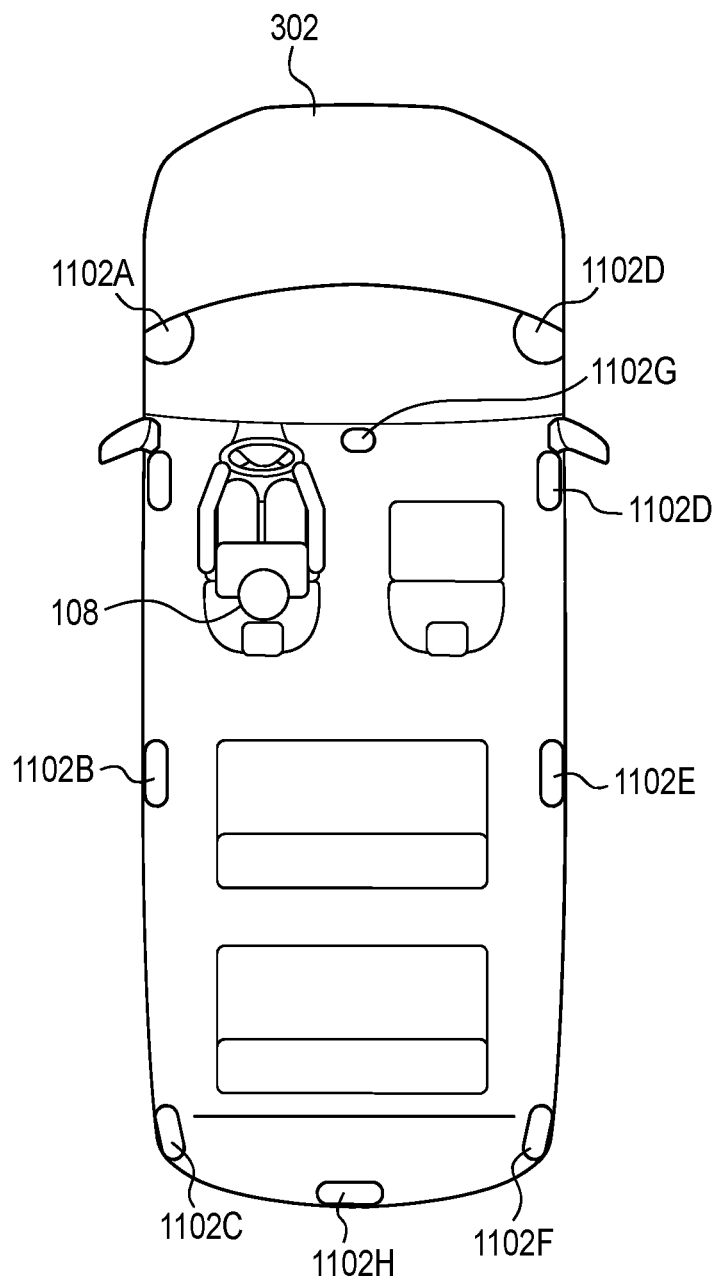
FIG. 11 is a schematic diagram that shows the exemplary vehicle providing visual information regarding the service requestor mobile device in accordance with one aspect of the present disclosure.

Other types of information may be provided to indicate the direction and/or distance that the service requestor 106 is from the vehicle 302. FIG. 11 is a schematic diagram that shows the exemplary vehicle 302 providing visual information regarding the service requestor mobile device 104 in accordance with one aspect of the present disclosure. For purposes of illustration, the vehicle 302 for the service provider 108 may include, but is not limited to, a number of lights 1102A, 1102B, 1102C, 1102D, 1102E, 1102F, 1102G and 1102H (Collectively "lights 1102" and individually "light 1102").

In one embodiment, different intensities of the lights 1102 may indicate the distance between the service requestor mobile device 104 to the vehicle 302 while specific lights 1102 may show directional information of the approaching device 104. For example, the higher intensity, the closer the device 104 is closer to the vehicle 302.

A front left light 1102A of the vehicle 302 may indicate that the service requestor mobile device 104 is approaching to the front left of the vehicle 302 while the left side light 1102B may indicate that the device 104 is approaching on the left side. The back left light 1102C may indicate that a service requestor 106 is approaching from that side. The back light 1102H may indicate that the service requestor 106 is approaching from the back. In one embodiment, the service requestor 106 may ask for opening the vehicle 302 and information on the light may indicate so. For example, the light 1102H may blink several times indicating to the service provider 108 that they should be opening the back trunk or door.

The back right light 1102F may indicate that the service requestor mobile device 104 is approaching from the back right of the vehicle 302. The side right light 1102E may indicate that the service requestor 106 is approaching from the right side. The right front light 1102D of the vehicle 302 may indicate that the service requestor 106 is approaching from the right front. Finally, if the service requestor 106 is approaching from the front of the vehicle 302, the front light 1102G may be shown.

Other configurations of the lights 1102 may exist. For example, if a service requestor 106 is between lights 1102E and 1102F, then both may be activated. More complex lights may exist such that an exact location may be given, that is, the lights 1102 may be include multiple lights within them. This may allow the exact location of where the service requestor 106 is approaching.

In one embodiment, the lights 1102 may be seen from outside the vehicle 302 indicating to the service requestor 106 which vehicle 302 the service provider 108 is in. The lights 1102 may also indicate a correct service requestor 106 and not for an erroneous requestor. Other configurations may exist for the vehicle 302. For example, lights may be provided on the outside of the vehicle 302 to indicate to the service requestor 106 where the service provider 108 is located.

Figure 12:
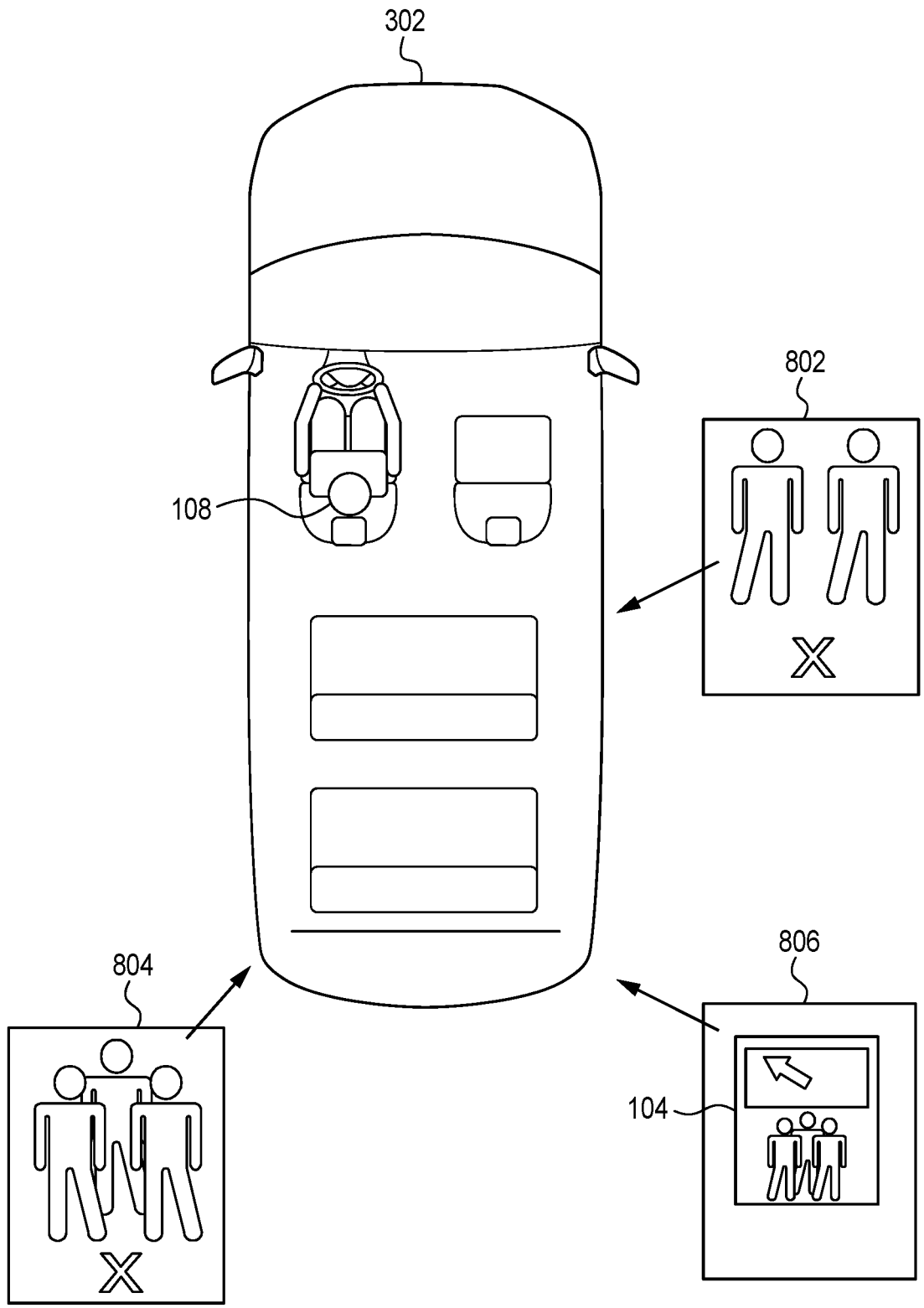
FIG. 12 is a schematic diagram of an exemplary service requestor mobile device providing information about the service provider in accordance with one aspect of the present disclosure.

On the other side, the service requestor 106 may have additional information to lead them to the vehicle 302 and the service provider 108. FIG. 12 is a schematic diagram of an exemplary service requestor mobile device 104 providing information about the service provider 108 in accordance with one aspect of the present disclosure. For purposes of illustration, the pedestrians 802, 804 and 806 may be going towards the vehicle 302 and/or surrounding the vehicle 302.

In this scenario, the pedestrians 806 on the bottom right may be the correct pedestrians and those who ordered the service. The service requestor mobile device 104 may indicate on its display 508 the direction of the service provider 108, their vehicle 302 and/or their service provider mobile device 110. This may be indicated by a directional arrow or other indicator on the display 508. Audio information may also be provided through the service requestor mobile device 104.

Figure 13:
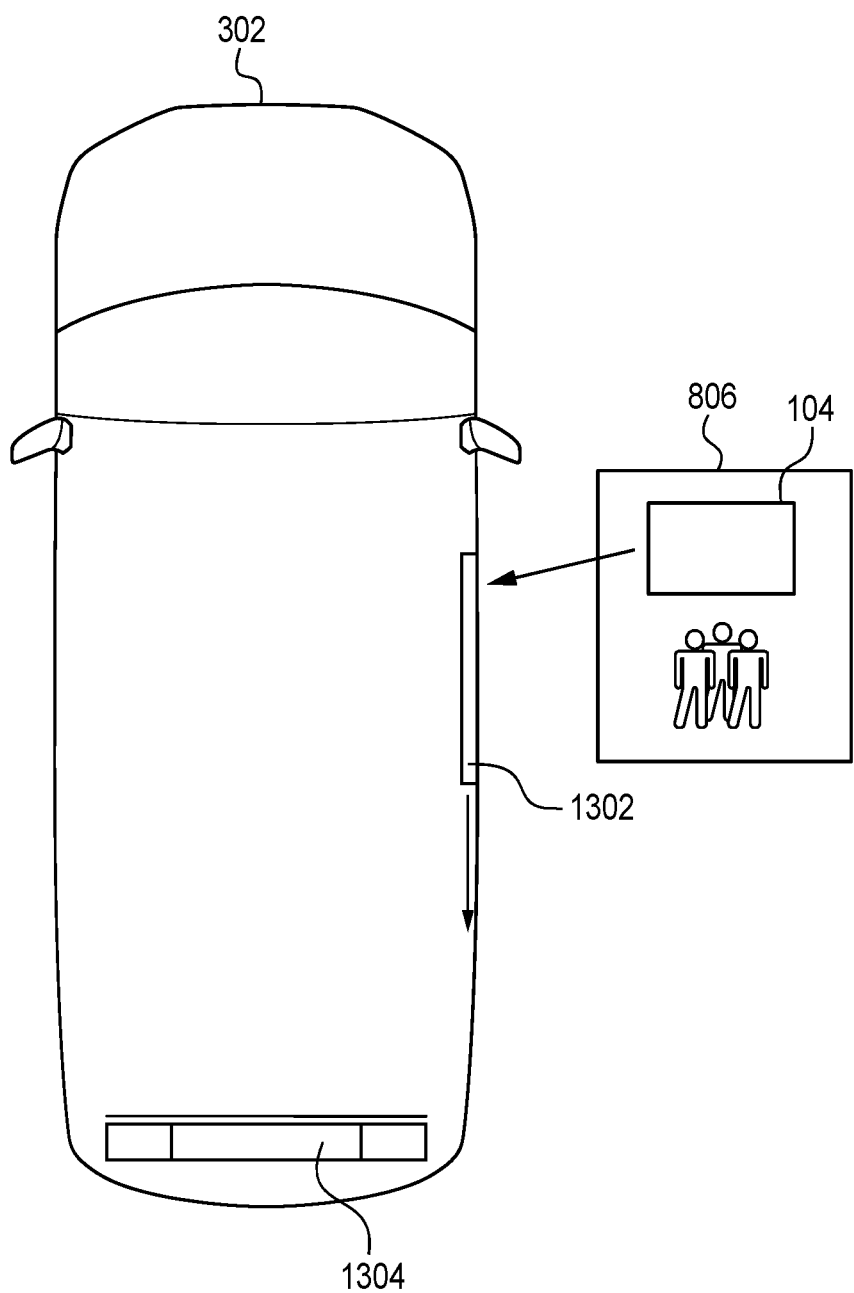
FIG. 13 is a schematic diagram that shows an exemplary door unlocking and opening when the service requestor mobile device is nearby in accordance with one aspect of the present disclosure.

FIG. 13 is a schematic diagram that shows an exemplary door 1302 unlocking and opening when the service requestor mobile device 104 is nearby in accordance with one aspect of the present disclosure. The door 1302 may remain locked until the pedestrians 1206 are near, that is, when the mobile device 104 is far away from the vehicle 302, then it will remain locked.

If the service requestor mobile device 104 is within a predetermined distance, for example two feet, the vehicle 302 may unlock the door 1302. Advantageously, this may prevent the other pedestrians 802 and 804 from entering into the vehicle. In one embodiment, the door 1302 may automatically open, for example, in the minivan. As shown as being the right door 1302, other doors may be unlocked and further opened automatically. Lights within the vehicle may turn on once the door 1302 is opened.

In one embodiment, the back door may open if the service requestor 106 has indicated that they have objects that are to be stored in the back. The service requestor mobile device 104 may have an option to indicate that the back door should be opened once the correct pedestrians 806 are nearby. This may result in unlocking the backdoor 1304 of the vehicle 302 and opening it automatically.

In one embodiment, a temporary key may be provided to the service requestor mobile device 104 such that the doors 1302 and/or 1304 may be opened by the mobile device 104. These may be transferred through direct communications or indirectly through the unified gateway 102. After the doors 1302 and/or 1304 are opened and/or closed, the temporary key may be deleted permanently. Alternatively, a period of time may be associated with the temporary key such that it disappears or is deleted from the mobile device 104 when that period of time expires.

FIG. 14 is a block diagram that provides illustrative processes from the perspective of the service requestor 106 in accordance with one aspect of the present disclosure. The processes may begin at block 1400. At block 1402, the service requestor 106 may open the MaaS application 524. This application 524 may be opened on the service requestor mobile device 104. The service requestor 106 may enter in their final destination in the application 524 at block 1404. This may be accomplished by voice recognition, touchpad, keyboard and the like. This information may be provided to the unified gateway 102.

At block 1406, a pickup location may be determined. This may be the location of the service requestor mobile device 104. Alternatively, the location may be entered in. After determining the destination and pickup location, the unified gateway 102 may be provided this information. Other information may be provided as well such as the number of occupants that are going to be getting a ride, type of vehicle request, and the like. In one embodiment, and if the service requestor 106 has a number of objects and/or items with them, this information may be entered into the service requestor mobile device 104. Using this information, the unified gateway 102, or other system, may determine that the doors 1302 and/or 1304 should be automatically opened and/or closed, as described above.

Information about appropriate service providers 108 may then be sent to the service requestor 106 and their service requestor mobile device 104. The service requestor 106 may then schedule a vehicle at block 1408. Once scheduled, the vehicle may become the service provider vehicle 302. The specific service provider 108 with their service provider mobile device 110 may be determined and summoned to pickup the service requestor 106 and other occupants. The service provider 108 may then navigate to the pickup location.

At block 1410, the service requestor 106 and other occupants may wait for the vehicle 302 and the service provider 108 to pick them up. At block 1412, the service requestor 106 through their service requestor mobile device 104 may receive service provider 108 presence information. That is, when the service provider 108 has arrived at the pickup location, this information may be sent to service requestor 106. At optional block 1414, and in accordance with one embodiment, the service requestor mobile device 104 may provide the direction of the service provider 108 and their vehicle 302 on the mobile device 104. This may be part of a directional arrow, or other visual or audio cue. The processes may end at block 1416.

FIG. 15 is a block diagram that provides illustrative processes from the perspective of the service provider 108 in accordance with one aspect of the present disclosure. The processes may begin at block 1500. At block 1502, the service provider 108 may open the MaaS application 524. This application 524 may be opened on the service provider mobile device 110. The service provider 108 may provide their vehicle information at block 1504. This may include type of vehicle, how many passengers may be picked up and the like.

At block 1506, the service provider 108 may display that their service is available through the unified gateway 102. This information may be provided to the unified gateway 102 such that a service requestor 106 may select the service from the service providers 108. Other information that the service providers 108 may include is their current location and arrival time to the pickup location, if selected. This information may be calculated within the unified gateway 102. There may be a number service providers 108 within the area. The service provider 108 may then wait at block 1508.

The service provider 108, through their service provider mobile device 110, may receive a vehicle request from a service requestor 106 at block 1510. This may be established through the unified gateway 102. The request may be based on geography, settings of the vehicle and the like. The service requestor 106 may have a number of service providers 108 to select and the requestor 106 may choose the appropriate provider 108 that fits their needs.

At block 1512, the service provider 108 may drive towards the pickup location that was specified by the service requestor 106. At block 1514, the service provider 108 and their vehicle 302 may stop at the pickup location. Information may then be provided to indicate that the service provider 108 is at the pickup location.

At block 1516, the vehicle 302 may provide the location and/or distance of the service requestor 106 and their mobile device 104 from the vehicle 302 through audio or visual cues. The distance and/or approaching direction may be communicated either indirectly or directly, as described above. In one embodiment, the vehicle 302 may unlock the doors 1302 for the service requestor 106 and/or automatically open the doors 1302 at optional block 1518. The back door 1304 may be opened if the service requestor 106 needs to load objects in back of the vehicle 302. The processes may end at block 1520.

Typically, after the service requestor 106, and any associated passengers, are within the vehicle 302, the service provider 108 may transport the service requestor 106 to their intended destination. The processes may begin anew when dropped off. That is, the service provider 108 may interact with the unified gateway 102 to receive new service requestors 106.

FIG. 16 is a block diagram that provides illustrative processes from the perspective of the unified gateway 102 in accordance with one aspect of the present disclosure. The processes may begin at block 1600. Before establishing a relationship between a service requestor 106 and service provider 108, information about the service providers 108 may be received. The information from the service providers 108 may include the type of vehicle 302 they are driving, number of passengers they are capable of picking up, location information, and the like. This information may be constantly updated and provided to service requestors 106.

At block 1602, the unified gateway 102 may receive the vehicle request from the service requestor 106 through their service requestor mobile device 104. At block 1604, the unified gateway 102 may identify vehicles that may be capable of satisfying the request for the ride. This may be performed through geographic, type of vehicle, and the like.

The vehicles that are capable of satisfying the request are provided to the service requestor 106 at their service requestor mobile device 104 at block 1606. This may be provided over the network 1402 to the MaaS application 524. At block 1608, the unified gateway 102 may receive a selected vehicle from the service requestor 106. This may be inputted through the service requestor mobile device 104.

At block 1610, the unified gateway 102 may schedule the service provider 108 through the service provider mobile device 110. This may include providing information to the service provider 108 and giving them the information about the service requestor 106. This may include pickup location and destination. At block 1612, the service requestor 106 information may be provided to the selected vehicle 302 such that the pickup may be made. The processes may end at block 1614.

The foregoing description is provided to enable any person skilled in the relevant art to practice the various embodiments described herein. Various modifications to these embodiments will be readily apparent to those skilled in the relevant art and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A method for providing information within a Mobility as a Service (MaaS) vehicle operating through a unified gateway regarding a service requestor mobile device, the method comprising:
    receiving a pickup request at a location for the MaaS vehicle from the service requestor mobile device through the unified gateway, the pickup request including a number of occupants or number of additional baggage objects;
    determining a distance between the service requestor mobile device and the MaaS vehicle at the location;
    identifying an approaching direction of the service requestor mobile device to the MaaS vehicle;
    providing information within the MaaS vehicle indicating the distance and the approaching direction of the service requestor mobile device;
    providing the service requestor mobile device with a temporary key;
    determining a lock state of a door of the Maas vehicle;
    unlocking the door of the MaaS vehicle using the temporary key when the distance between the MaaS vehicle from the service requestor mobile device which initiated the pickup request is less than a predetermined threshold based on the door of the MaaS vehicle being in a locked state and unlocking a second door of the MaaS vehicle using the temporary key based on the number of occupants or number of additional baggage objects; and
    deleting the temporary key after the unlocked door is opened.

2. The method for providing information within the MaaS vehicle of claim 1, comprising establishing a location of the MaaS vehicle by associating a service provider mobile device with the MaaS vehicle.

3. The method for providing information within the MaaS vehicle of claim 2, wherein determining the distance and identifying the approaching direction comprises detecting global positioning system (GPS) coordinates for the service requestor mobile device and the service provider mobile device.

4. The method for providing information within the MaaS vehicle of claim 1, wherein determine the distance and identifying the approaching direction comprises establishing a local wireless connection between the MaaS vehicle and the service requestor mobile device.

5. The method for providing information within the MaaS vehicle of claim 1, wherein providing information within the MaaS vehicle indicating the distance and the approaching direction of the service requestor mobile device comprises broadcasting audio.

6. The method for providing information within the Maas Vehicle of claim 5, wherein broadcasting audio comprises activating at least one speaker of a plurality of speakers in the MaaS vehicle to indicate the distance and approaching direction.

7. The method for providing information within the MaaS vehicle of claim 5, wherein broadcasting audio comprises adjusting the audio mimicking the distance and approaching direction of the service requestor mobile device.

8. The method for providing information within the MaaS vehicle of claim 1, wherein providing information within the MaaS vehicle indicating the distance and the approaching direction of the service requestor mobile device comprises activating at least one light of a plurality of lights in or on the MaaS vehicle.

9. The method of providing information within the MaaS vehicle of claim 1, comprising automatically opening the door.

10. A vehicle within a Mobility as a Service (MaaS) network operating through a unified gateway comprising:
- a receiver communicating with the unified gateway;
- at least one indicator; and
- a control system receiving a location of a service requestor mobile device through the receiver communicating with the unified gateway, wherein the control system determines an approaching direction of the service requestor mobile device and provides information about the approaching direction through the at least one indicator,
- wherein the control system provides the service requestor mobile device with a temporary key, a number of occupants or number of additional baggage objects, and a lock state of a door of a Maas vehicle,
- wherein the door of the MaaS vehicle is unlocked using the temporary key when the distance between the MaaS vehicle from the service requestor mobile device which initiated a pickup request is less than a predetermined threshold based on the door of the MaaS vehicle being in a locked state and wherein a second door of the MaaS vehicle is unlocked using the temporary key based on the number of occupants or number of additional baggage objects, and
- wherein the temporary key is deleted after the unlocked door is opened.

11. The vehicle within the Mobility as a Service (MaaS) network of claim 10, wherein the control system receives the location of the service requestor mobile device from the unified gateway when the vehicle stops at a pickup location.

12. The vehicle within the Mobility as a Service (MaaS) network of claim 10, wherein the control system receives the location of the service requestor mobile device through constant updates from the unified gateway.

13. A vehicle computing system within a Mobility as a Service (Maas) vehicle in communication with a unified gateway comprising:
- at least one processor; and
- a memory operatively coupled to the processor, the memory storing program instructions that when executed by the processor, causes the processor to:
  - receive a distance and approaching direction of a service requestor mobile device and a number of occupants or number of additional baggage objects;
  - provide an audio or visual indicator within the vehicle based on the distance and approaching direction of the service requestor mobile device;
  - determine a lock state of a door of the Maas vehicle; and
  - unlock the door of the MaaS vehicle using a temporary key when the distance between the MaaS vehicle from the service requestor mobile device which initiated a pickup request is less than a predetermined threshold based on the door of the MaaS vehicle being in a locked state and unlock a second door of the MaaS vehicle using the temporary key based on the number of occupants or number of additional baggage objects, wherein the temporary key is deleted permanently after the unlocked door is opened.

14. The vehicle computing system within the MaaS vehicle of claim 13, wherein the unified gateway determines the distance and approaching direction of the service requestor mobile device.

15. The vehicle computing system within the MaaS vehicle of claim 14, wherein providing the audio indicator comprises increasing an intensity of the audio indicator as the distance between the vehicle and the service requestor mobile device is reduced.

16. The vehicle computing system within the MaaS vehicle of claim 14, wherein the memory storing program instructions, when executed by the processor, causes the processor to unlock and automatically open the door of the vehicle when instructions are received from the unified gateway by the service requestor mobile device.

17. The vehicle computing system within the MaaS vehicle of claim 13, wherein providing the audio indicator comprises adjusting audio mimicking the distance and approaching direction of the service requestor mobile device.

18. The vehicle computing system within the MaaS vehicle of claim 17, comprising creating a sound void for adjusting the audio.

19. The vehicle computing system within the MaaS vehicle of claim 13, wherein providing the audio indicator comprises activating at least one speaker of a plurality of speakers in the vehicle to indicate the distance and approaching direction.

* * * * *